(12) United States Patent
Choi et al.

(10) Patent No.: US 8,184,585 B2
(45) Date of Patent: May 22, 2012

(54) METHOD FOR ALLOCATING RESOURCE, AND METHOD FOR TRANSMITTING RESOURCE ALLOCATION INFORMATION

(75) Inventors: Sung Duk Choi, Anyang-si (KR); Young Woo Yun, Anyang-si (KR); Ki Jun Kim, Anyang-si (KR); Suk Hyon Yoon, Anyang-si (KR); Joon Kui Ahn, Anyang-si (KR); Hak Seong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 533 days.

(21) Appl. No.: 12/513,163

(22) PCT Filed: Nov. 1, 2007

(86) PCT No.: PCT/KR2007/005496
§ 371 (c)(1),
(2), (4) Date: Apr. 30, 2009

(87) PCT Pub. No.: WO2008/054157
PCT Pub. Date: May 8, 2008

(65) Prior Publication Data
US 2010/0067479 A1    Mar. 18, 2010

Related U.S. Application Data

(60) Provisional application No. 60/863,932, filed on Nov. 1, 2006.

(30) Foreign Application Priority Data

Jan. 9, 2007  (KR) .......................... 10-2007-0002672

(51) Int. Cl.
*H04W 4/00* (2009.01)
(52) U.S. Cl. ....................................................... 370/330
(58) Field of Classification Search .................. 370/330, 370/436, 478, 431, 329, 321
See application file for complete search history.

(56) References Cited

U.S. PATENT DOCUMENTS

2008/0049692 A1*  2/2008  Bachu et al. .................. 370/338

FOREIGN PATENT DOCUMENTS

| WO | 2006032988 | 3/2006 |
|---|---|---|
| WO | 2007078171 | 7/2007 |
| WO | 2007108602 | 9/2007 |

\* cited by examiner

*Primary Examiner* — Kwang B Yao
*Assistant Examiner* — Anh Ngoc Nguyen
(74) *Attorney, Agent, or Firm* — Lee, Hong, Degerman, Kang & Waimey

(57) ABSTRACT

A resource allocation method and a resource allocation information transmission method are provided. Smallest units of resource allocation are set as basic resource blocks and groups of a specific number of basic resource blocks are set as group resource blocks. Resources can be allocated in units of basic resource blocks or in units of group resource blocks depending on the amount of resources required for data transmission of each UE. Resource allocation information for allocation in units of basic resource blocks is set to be different from resource allocation information for allocation in units of group resource blocks, thereby achieving efficient allocation of communication resources.

10 Claims, 11 Drawing Sheets

FIG. 10

|  |  | Possible Consecutive Allocation Length of Each Start Index (1~12) |  |  |  |  |  |  |  |  |  |  |
|---|---|---|---|---|---|---|---|---|---|---|---|---|
| Start Index | 1 | ▨ | ▨ | ▨ | ▨ | ▨ | ▨ | ▨ | ▨ | ▨ | ▨ | ▨ | ▨ |
|  | 2 | ▨ | ▨ | ▨ | ▨ | ▨ | ▨ | ▨ | ▨ | ▨ | ▨ | ▨ |  |
|  | 3 | ▨ | ▨ | ▨ | ▨ | ▨ | ▨ | ▨ | ▨ | ▨ | ▨ |  |  |
|  | 4 | ▨ | ▨ | ▨ | ▨ | ▨ | ▨ | ▨ | ▨ | ▨ |  |  |  |
|  | 5 | ▨ | ▨ | ▨ | ▨ | ▨ | ▨ | ▨ | ▨ |  |  |  |  |
|  | 6 | ▨ | ▨ | ▨ | ▨ | ▨ | ▨ | ▨ |  |  |  |  |  |
|  | 7 | ▨ | ▨ | ▨ | ▨ | ▨ | ▨ |  |  |  |  |  |  |
|  | 8 | ▨ | ▨ | ▨ | ▨ | ▨ |  |  |  |  |  |  |  |
|  | 9 | ▨ | ▨ | ▨ | ▨ |  |  |  |  |  |  |  |  |
|  | 10 | ▨ | ▨ | ▨ |  |  |  |  |  |  |  |  |  |
|  | 11 | ▨ | ▨ |  |  |  |  |  |  |  |  |  |  |
|  | 12 | ▨ |  |  |  |  |  |  |  |  |  |  |  |

METHOD FOR ALLOCATING RESOURCE, AND METHOD FOR TRANSMITTING RESOURCE ALLOCATION INFORMATION

CROSS-REFERENCE TO RELATED APPLICATIONS

This application is the National Stage filing under 35 U.S.C. §371 of International Application No. PCT/KR2007/005496, filed on Nov. 1, 2007, which claims the benefit of U.S. Provisional Application Nos. 60/863,932, filed on Nov. 1, 2006 and claims benefit of earlier filing date and right to priority to Korean Application No. 10-2007-0002672, filed on Jan. 9, 2007.

TECHNICAL FIELD

The present invention relates to multicarrier mobile communication, and more particularly, to a method for efficiently allocating resources for uplink/downlink data transmission in multicarrier mobile communication and a method for efficiently transmitting resource allocation information indicating the allocation of resources for uplink/downlink data transmission.

BACKGROUND ART

In a multicarrier mobile communication system, a Base Station (BS) performs downlink data transmission to User Equipments (UEs) in one or more cells. The BS needs to allocate communication resources in the time-frequency domain to each UE when the BS transmits downlink data to a specific UE since a plurality of UEs may be present in a cell and each UE does not know when and in which format data will be transmitted to the UE. The BS transmits information of such resource allocation to each UE by transmitting a control signal including the resource allocation information to the UE.

In order for each UE to transmit data packet in the uplink, the BS also needs to allocate communication resources in the time-frequency domain to each UE and to transmit control information to allow the UE to transmit data through the uplink.

When the BS allocates resources for data transmission in the uplink/downlink, for example in the OFDM system, the BS can define a small unit such as one subcarrier, a large unit such as tens of subcarriers, or a larger unit as a basic unit of the allocation.

When small allocation units such as subcarriers are used for resource allocation of the BS, resource allocation information for data transmission, which the BS transmits to each UE using a control signal, includes all information as to whether or not each subcarrier is allocated to the UE, thereby increasing the overhead. On the other hand, when larger allocation units are used, there is an advantage in that the overhead is reduced while there is a problem in that the flexibility of resource allocation is reduced since each UE cannot be allocated small resources for data transmission.

For example, let us assume that 576 subcarriers can be used for downlink data transmission in an OFDMA system with subcarrier intervals of 15 KHz in a 10 MHz system band. In this case, if a single basic resource block as a minimum unit of resource allocation is designed to include a unit time of 0.5 ms and 12 subcarriers, the total band is divided into 96 basic resource blocks every 1 ms and, when transmitting data to each UE every 1 ms, the BS must inform the UE of which one of the 96 basic resource blocks is used to transmit the data to the UE through resource allocation information such as scheduling information.

Here, in order to allow a scheduler of the BS to transmit data through any basic resource blocks to any UE under no constraints, a scheduling command for each UE must include 96-bit information individually representing the used resource blocks. Specifically, if signaling for resource allocation informs each UE whether or not a corresponding resource block has been used according to whether a specific bit is "0" or "1", the signaling for resource allocation will require 96 bits, resulting in large overhead.

However, using a larger number of subcarriers as a base resource block unit to reduce the overhead causes problems in the flexibility of resource allocation. For example, if transmission data, which has an amount to be transmitted through 36 subcarriers for 1 ms, is generated in a transmission buffer for a UE when 72 subcarriers are set as a base resource block unit, the BS must transmit the data using a larger amount of frequency-time resources than required since a basic resource block consists of 72 subcarriers or must delay the transmission until another data to fill the basic resource block is generated for the UE.

Accordingly, there is a need to provide a resource allocation method, which can overcome these resource allocation flexibility problems and the above resource allocation information overhead problems, and a method for transmitting resource allocation information for the same.

DISCLOSURE

Technical Problem

An object of the present invention devised to solve the problems lies on providing a resource allocation method, which compensates for one problem that using small resource allocation units increases the signaling overhead for resource allocation information transmission and another problem that using large resource allocation units decreases the flexibility of resource allocation of small data, and an efficient method for transmitting resource allocation information used in the resource allocation method to each UE.

Technical Solution

An embodiment of the present invention to achieve the object provides a method for allocating resources to a plurality of user equipments (UEs) in a communication system, wherein basic resource blocks are preset as smallest units of resource allocation and group resource blocks are preset as units, each being a group of a specific number of basic resource blocks, the method including defining at least one of the plurality of UEs as a first-type UE and at least one other of the plurality of UEs as a second-type UE; and allocating resources in units of the group resource blocks to the first-type UE and in specific units other than the group resource blocks to the second-type UE.

Here, one method for allocating resources to the second-type UE may be to allocate resources in units of the basic resource blocks to the second-type UE. The resource allocation method is not limited to this method and resources may be allocated in any other units to decrease the reduction in the flexibility due to use of the group resource allocation method.

Different resource allocation information may be transmitted to the first and second-type UEs, that is, resource allocation information transmitted to the first-type UEs is different from that transmitted to the second-type UEs, and the different resource allocation information may include different type indicators.

Another embodiment of the present invention provides a method for transmitting resource allocation information to a plurality of user equipments (UEs) in a communication system, wherein basic resource blocks are preset as smallest units of resource allocation and group resource blocks are preset as units, each being a group of a specific number of basic resource blocks, the method including defining at least one of the plurality of UEs as a first-type UE and at least one other of the plurality of UEs as a second-type UE; transmitting first-type resource allocation information used to allocate resources in units of the group resource blocks to the first-type UE; and transmitting second-type resource allocation information used to allocate resources in specific units other than the group resource blocks to the second-type UE.

Also in this embodiment, one method for allocating resources to the second-type UE may be to allocate resources in units of the basic resource blocks to the second-type UE. The resource allocation method is not limited to this method and resources may be allocated in any other units to decrease the reduction in the flexibility due to use of the group resource allocation method.

Each of the first-type resource allocation information and the second-type resource allocation information may include type information (I) indicating a resource allocation information type. The first-type resource allocation information further may include group resource block allocation information (K) indicating a group resource block allocated to each first-type UE. The second-type resource allocation information may includes group resource block index information (O) indicating an index of a group resource block including a basic resource block allocated to each second-type UE; and basic resource block allocation information (R) indicating a basic resource block allocated to each second-type UE in the group resource block having this index.

The group resource block index information (O) may include at least two group resource block index information (O) and the basic resource block allocation information (R) may include at least two basic resource block allocation information (R).

Reserved information (Nu) having a length equal to the difference between a length of the first-type resource allocation information and a length of the second-type resource allocation information may be inserted into a shorter one of the first-type resource allocation information and the second-type resource allocation information.

The communication system may allocate resources of consecutive time-frequency regions to each UE and at least one of the group resource block allocation information (K), wherein the basic resource block allocation information (R) may include start index information of group resource blocks or basic resource blocks allocated to each UE and block count information of the group resource blocks or basic resource blocks allocated to each UE.

Finally, at least one, including the start index information and the block count information, of the group resource block allocation information (K) and the basic resource block allocation information (R) may have a length required to express $1(1+1)/2$ combinations when "1" is the total number of indices of the group resource blocks or the basic resource blocks.

Advantageous Effects

Resources are allocated in units of group resource blocks or basic resource blocks to each UE according to the characteristics of the UE to compensate for the problem that using small resource allocation units increases the signaling overhead for resource allocation information transmission and the problem that using large resource allocation units decreases the flexibility of resource allocation of small data, and different resource block allocation information is defined and transmitted according to the type of each UE to achieve efficient resource allocation in uplink/downlink.

DESCRIPTION OF DRAWINGS

In the drawings:

FIG. 10 illustrates the number of consecutive blocks which can be allocated for each start index in a communication system in which resources of consecutive time-frequency regions are allocated to each UE according to the embodiment of the invention.

MODE FOR INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

Although the detailed description of the present invention has been given mainly with reference to the OFDM system as an example for the sake of convenience of explanation, it will be apparent to those skilled in the art that the invention can be applied to various systems requiring that the base station (BS) allocate resources for data transmission in the time-frequency domain.

To explain a resource allocation method and a resource allocation information transmission method according to the embodiments of the present invention, first, we will describe a distributed allocation scheme and a localized allocation scheme as general resource allocation methods and then describe how these schemes can be used to set units of resource block allocation in the embodiments of the invention.

The BS can transmit data by distributing it over a broad band according to the distributed allocation scheme or can transmit data in a successive manner within a narrow band according to the localized allocation scheme. A scheduler in the BS can use one of the two schemes or a mixture of the two schemes according to predefined rules or the circumstances.

The localized allocation scheme has an advantage in that it increases the overall cell transmission efficiency since the scheduler in the BS can analyze channel states of UEs in the BS and allocate a band in a good channel state to each UE to allow the UE to transmit data over the band. On the other hand, the distributed allocation scheme has an advantage in that it improves the receiving performance of the UE since data is transmitted over a wide band to obtain a frequency diversity when the BS scheduler does not effectively cope with rapid channel changes.

Figure 1:
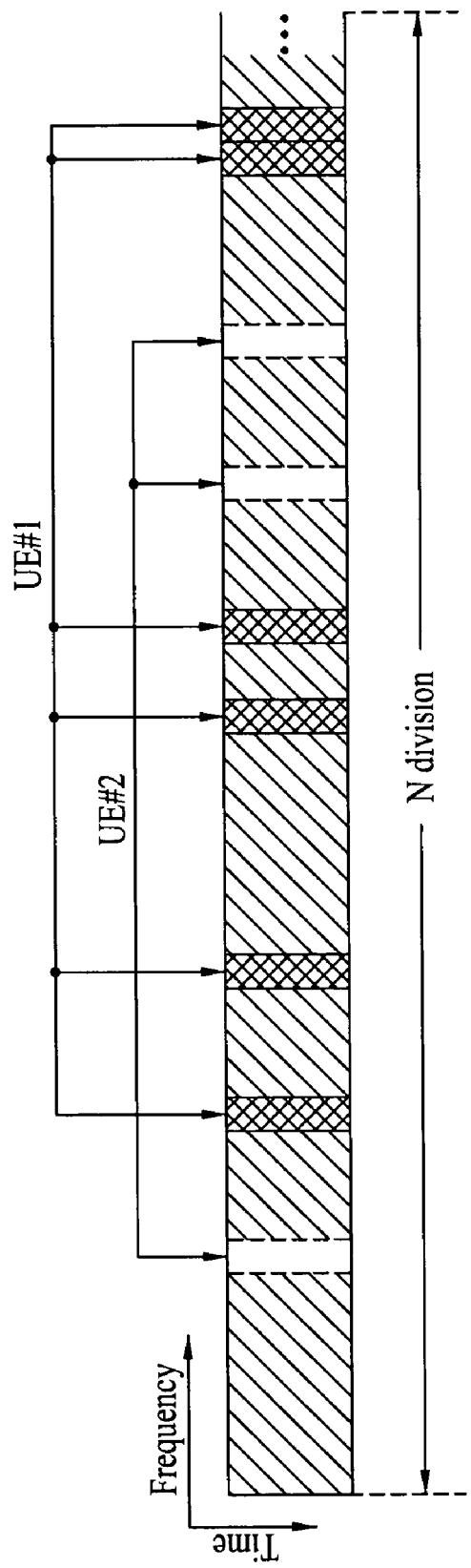
FIG. 1 illustrates a general distributed allocation scheme in an OFDM system.

FIG. 1 illustrates a general distributed allocation scheme in the OFDM system.

As shown in FIG. 1, a total system band can be divided into N small bands dedicated to distributed allocation. FIG. 1 shows an example in which part of the N bands are allocated to UEs UE#1 and UE#2 in a distributed fashion. The N bands can be further divided into subcarriers and can also be divided into groups of subcarriers.

Figure 2:
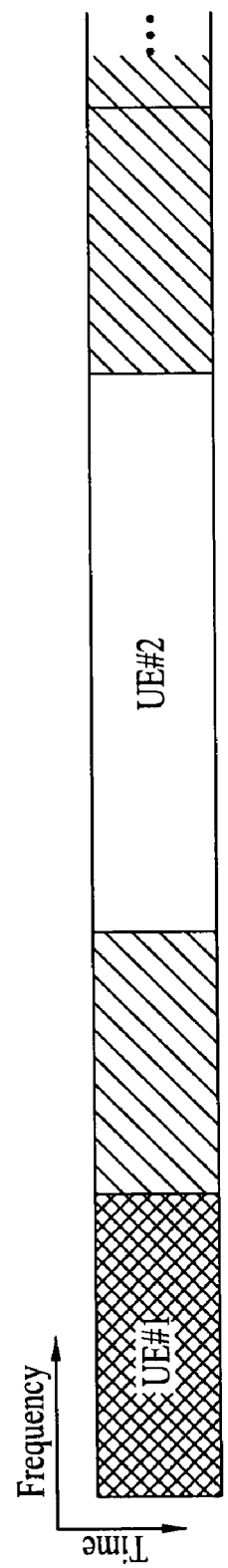
FIG. 2 illustrates a general localized allocation scheme in the OFDM system.

FIG. 2 illustrates a general localized allocation scheme in the OFDM system.

It can be seen from FIG. 2 that resource regions for data transmission of UEs UE#1 and UE#2 are allocated locally to specific bands included in the total system band.

In the distributed allocation scheme as shown in FIG. 1 and the localized allocation scheme as shown in FIG. 2, a BS must allocate resource regions for data transmission to UEs in a cell and transmit information regarding the resource region allocation to the UEs. The embodiments of the invention suggest that basic resource blocks which are the smallest units of allocation and group resource blocks, each of which is constructed by grouping a specific number of basic resource blocks, be set when allocating resource regions and transmitting resource region allocation information and different resource allocation and that different resource allocation information be applied to each UE. Reference will now be made in detail to these methods.

First, reference is made to various methods for setting basic resource blocks according to an embodiment of the invention.

Figure 3:
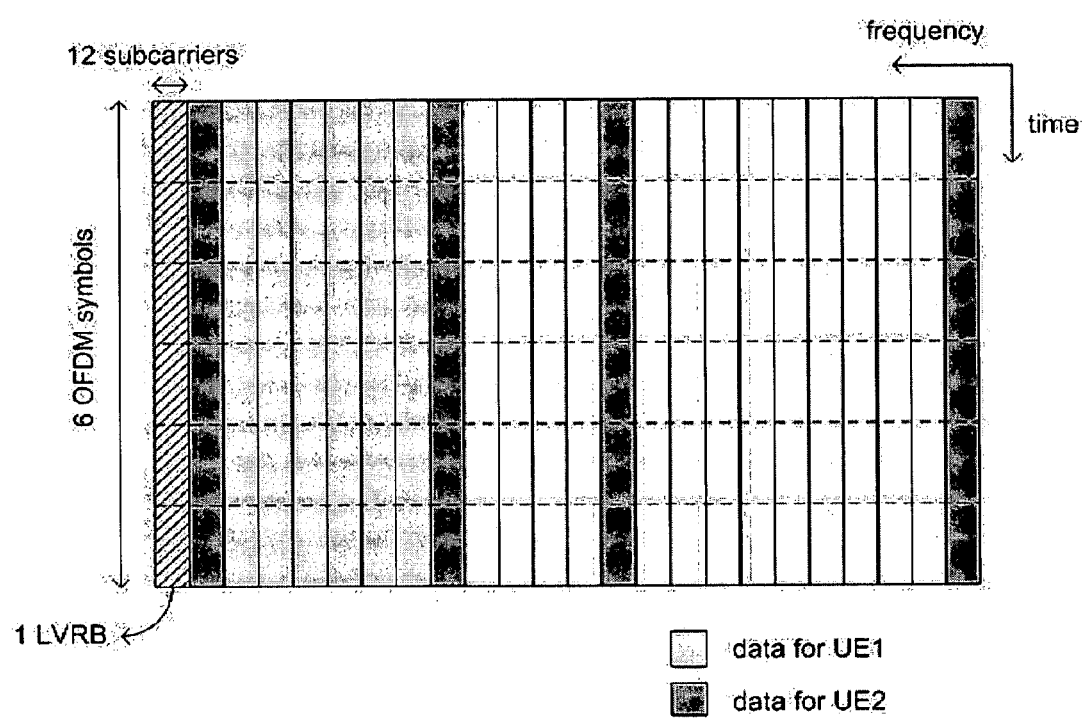
FIG. 3 illustrates an example in which basic resource blocks are set according to a structure for downlink signal transmission according to a localized allocation scheme.

FIG. 3 illustrates an example in which basic resource blocks are set according to a structure for downlink signal transmission according to a localized allocation scheme.

This is a specific example according to the embodiment of the invention in which the system band includes 288 subcarriers used for downlink data transmission and each base resource block, which is the smallest unit for resource allocation, is set to include 12 subcarriers over 6 OFDM symbols. In the case of this setting, the downlink has 24 basic resource blocks for each 6 OFDM symbols. When a basic resource block for localized allocation is referred to as a localized virtual resource block (LVRB), each LVRB includes 12 subcarriers as shown in FIG. 3 and localized allocation can be implemented by transmitting data through consecutive LVRBs to a UE as can be seen from the allocation of LVRBs to a first UE (UE1) in the example of FIG. 3. Distributed allocation effects can also be accomplished to achieve the frequency diversity gain by transmitting data through separate LVRBs in the frequency domain to a UE as can be seen from the allocation of LVRBs to a second UE (UE2) in the example of FIG. 3.

Figure 4A:
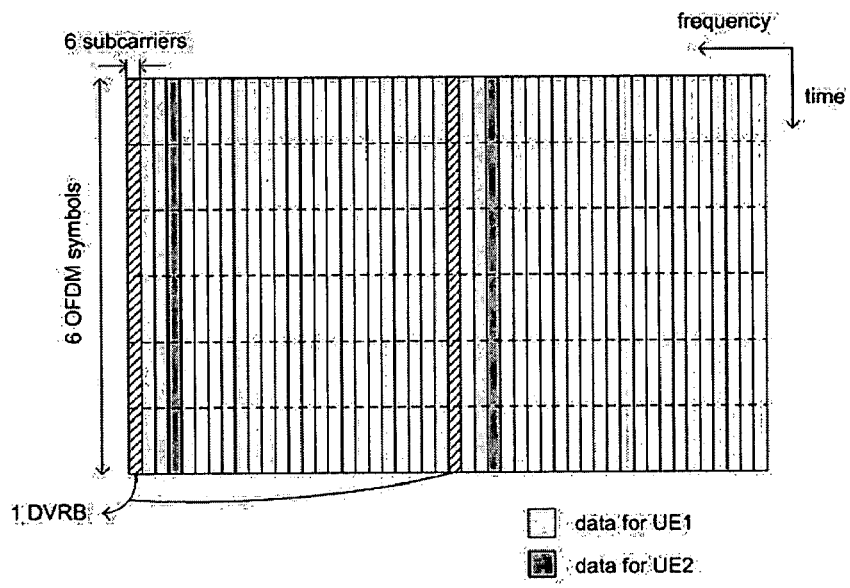
FIGS. 4A and 4B illustrate examples in which basic resource blocks are set according to a structure for downlink signal transmission according to a distributed allocation scheme.
Figure 4B:
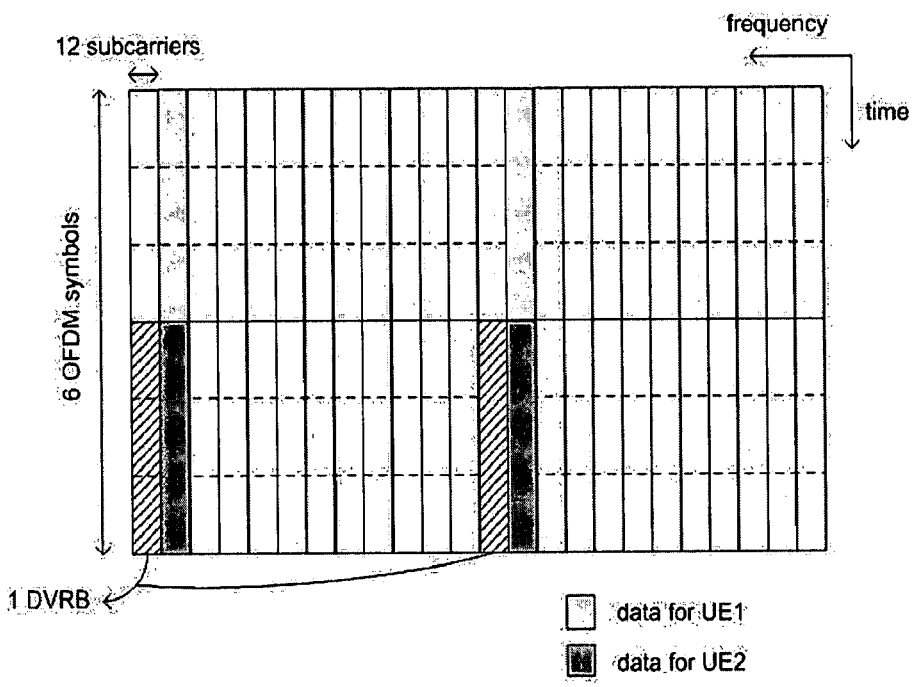

FIGS. 4A and 4B illustrate examples in which basic resource blocks are set according to a structure for downlink signal transmission according to a distributed allocation scheme.

When a basic resource block for distributed allocation is referred to as a distributed virtual resource block (DVRB), each DVRB may include separate subcarriers in the frequency domain or the time-frequency domain as shown in FIG. 4A or 4B in a different manner from that shown in FIG. 3. Specifically, FIG. 4A shows an example where a combination of 6 OFDM symbols and 6 subcarriers is set as a basic resource block and FIG. 4B shows an example where a combination of 3 OFDM symbols and 12 subcarriers is set as a basic resource block.

In this case, even when data of one basic resource block or a specific number of basic resource blocks is transmitted to one UE, distributed allocation can be achieved by distributing and transmitting the data over a wide band through inconsecutive subcarriers using a DVRB or DVRBs as can be seen from the examples of FIGS. 4A and 4B.

Basic resource blocks can be set in various manners according to requirements in the communication system as described above in the examples of FIGS. 3, 4A, and 4B.

In the following description of the embodiments of the invention, the "basic resource block" only needs to be a smallest unit for resource allocation, without being limited to specific numbers regarding resource regions described for illustrative purposes.

A method for allocating resources and transmitting resource allocation information according to embodiments of the invention will now be described with reference to an example where the method is applied to downlink transmission. The method described below can also be applied to uplink transmission under limited conditions, which will be described later.

An embodiment of the invention suggests that each "basic resource block" be set as the smallest unit for resource allocation to achieve efficient transmission of a small amount of data in a time-frequency domain which can be used for data transmission and each "group resource block" be set as a unit for resource allocation by grouping a predetermined number (N) of basic resource blocks in order to alleviate the problem that using such a small unit for allocation increases overhead when transmitting resource allocation information as described above.

An embodiment of the invention suggests a flexible resource allocation method in which group resource blocks are not used for resource allocation of all UEs while any other unit other than the group resource block, which can decrease the reduction in the flexibility due to the group resource allocation method, is allowed to be used for resource allocation of UEs with data for transmission, the amount of which is not appropriate for transmission in units of group resource blocks (for example, UEs which are mainly allocated a small amount of data, more specifically UEs which require N−1 or less basic resource blocks for data transmission). Preferably, resource allocation may be (but not necessarily) applied to such UEs which are not allocated resources in units of group resource blocks.

For convenience of explanation of this method, a UE, for which resource allocation in units of group resource blocks, each being a group of N basic resource blocks, is suitable, is referred to as a "first-type UE" and a UE, for which resource allocation in units of group resource blocks is not suitable while resource allocation in any units other than group resource blocks is suitable since it does not require a large amount of resource regions for data transmission, is referred to as a "second-type UE". Preferably, resource allocation of the second-type UE may be performed in units of basic resource blocks as described above. The following description will be given focusing on an example where resources are allocated in units of basic resource blocks to the second-type UE.

For example, 96 basic resource blocks are present in a time interval of 1 ms if a combination of a unit time of 0.5 ms and 12 subcarriers is set as the size of a basic resource block, taking into consideration transmission of a small amount of data, when 576 subcarriers are used for downlink data transmission in a 10 MHz system band. Here, if 96 basic resource blocks are scheduled in groups of 6 basic resource blocks according to predetermined rules according to an embodiment of the invention, resource blocks used for data transmitted to each UE can be expressed by 16 (=96/6) bits rather than 96 bits, thereby significantly reducing the signaling overhead for transmission of resource allocation information.

According to an embodiment of the invention, it is also possible to improve the flexibility of resource allocation for data transmission by designing resource allocation information for second-type UEs, for which data transmission in units of group resource blocks is not suitable since they transmit a small amount of data, to allow the second-type UEs to transmit data in units of basic resource blocks, instead of allocating resources in units of group resource blocks, each being a group of 6 basic resource blocks, to all UEs as first-type UEs as described above.

On the other hand, in an embodiment of the invention, methods for grouping N basic resource blocks into a group resource block according to predetermined rules can employ the following variety of techniques according to the rules.

Figure 5:
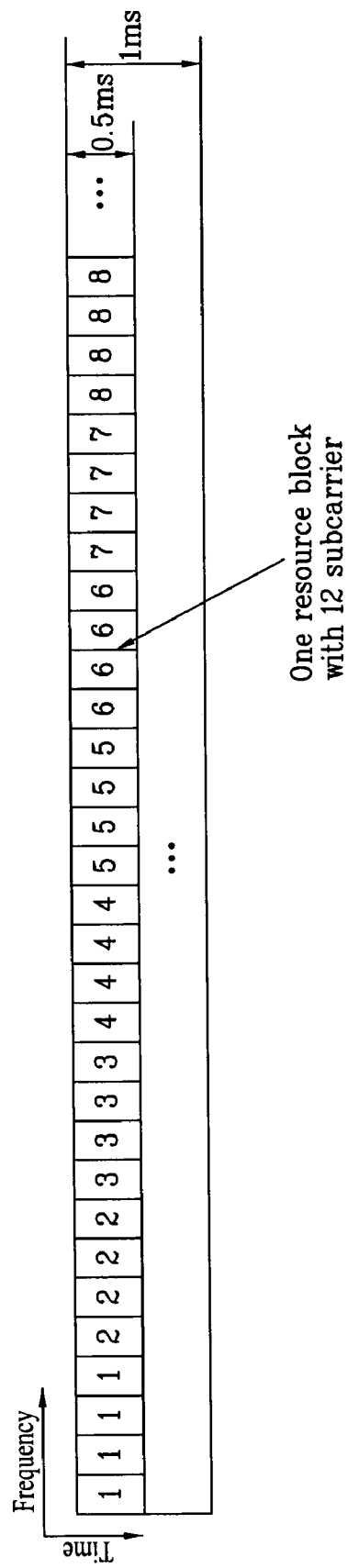
FIGS. 5 to 7 illustrate various examples of how group resource blocks are set according to embodiments of the invention.
Figure 6:
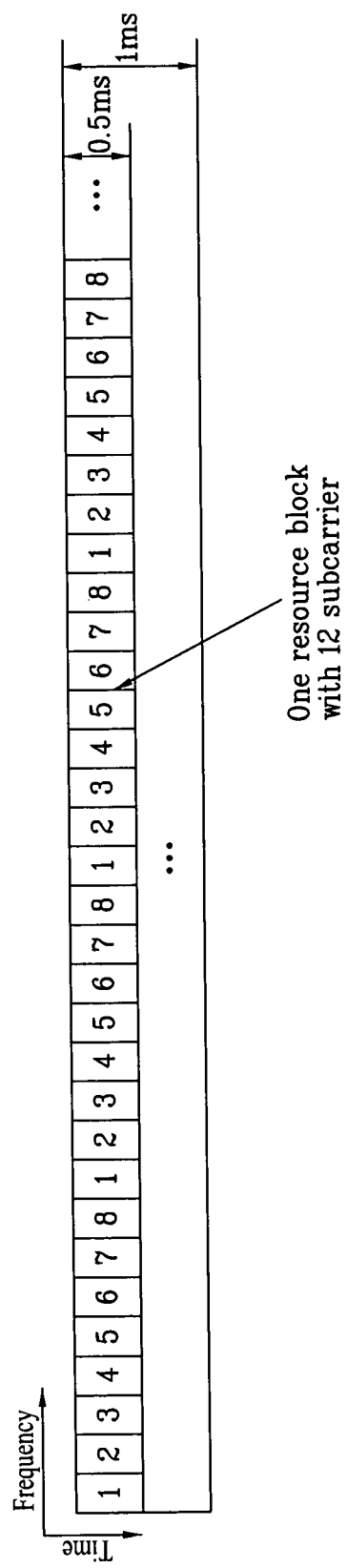
Figure 7:
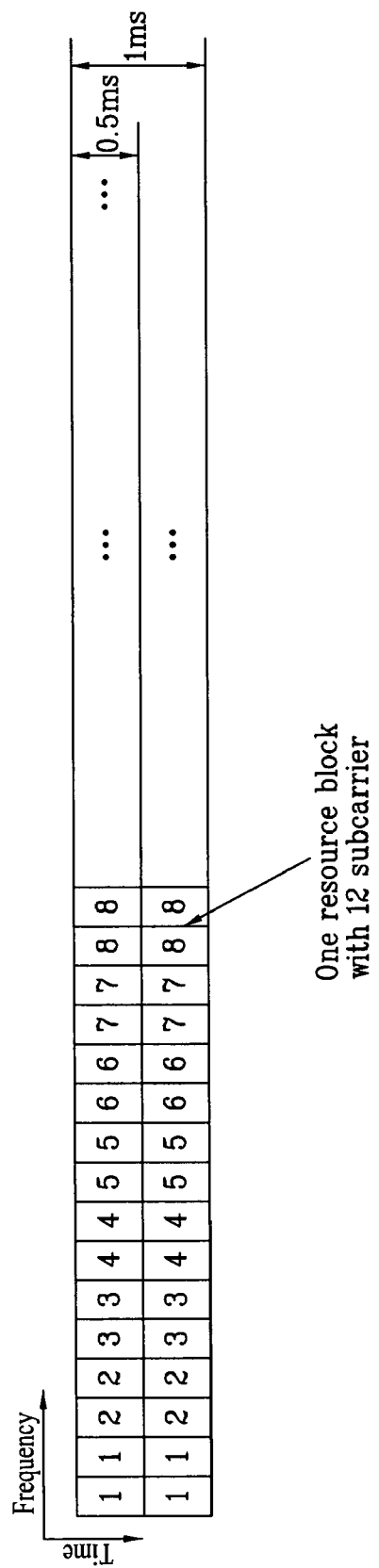

FIGS. 5 to 7 illustrate a variety of example methods for setting each group resource block according to an embodiment of the invention.

Specifically, FIGS. 5 to 7 show specific examples where, when 576 subcarriers are used for downlink data transmission in a 10 MHz system band, a combination of a unit time of 0.5 ms and 12 subcarriers is set as the size of a basic resource block, taking into consideration transmission of a small amount of data, and each group resource block is constructed by grouping 4 basic resource blocks in a time interval of 1 ms (i.e., N=4).

In the examples illustrated in FIGS. 5 to 7, basic resource blocks are indexed by 1, 2, 3, 4 and so on for the sake of convenience. In the example of FIG. 5, 4 basic resource blocks with the same index are grouped into a group resource block. In this example, each group resource block is constructed of basic resource blocks which are consecutive in the frequency domain according to a localized allocation scheme.

In the example of FIG. 6, basic resource blocks with the same index are grouped into a group resource block in the same manner as the example of FIG. 5, while basic resource blocks with the same index constituting a group resource block are separately distributed and allocated in the frequency domain according to a distributed allocation scheme in a different manner from that of FIG. 5.

In the example of FIG. 7, basic resource blocks with the same index are also grouped into a group resource block in such a manner that each group resource block is constructed of four basic resource blocks, two being consecutively allocated in a frequency region in the same time interval and the other two being consecutively allocated in the same frequency region in a consecutive time interval.

The rules for setting each group resource block using a specific number (N) of basic resource blocks in this manner may be changed as needed and the method for constructing each group resource block in the resource allocation method according to the embodiments of the invention is not necessarily limited to specific methods. Each UE can be informed in advance of the method for constructing each group resource block through a control signal or an upper layer signal.

When UEs (second-type UEs) that use resource allocation in units of small resource blocks (for example, resource allocation in units of basic resource blocks) and UEs (first-type UEs) that use resource allocation in units of large resource blocks which is advantageous in terms of signaling overhead according to the embodiments of the invention (for example, resource allocation in units of group resource blocks, each being a group of N basic resource blocks) are all considered, the signaling overhead is great if all information required by the UEs is transmitted so that all the UEs receive the information regardless of their characteristics (for example, regardless of whether they are allocated resources in units of basic resource blocks or in units of group resource blocks).

Thus, preferably, different resource allocation information according to the characteristics of UEs are signaled separately in a preferred embodiment of the invention. In the following description, resource allocation information for first-type UEs and resource allocation information for second-type UEs, which have different structures, are referred to as a "first-type resource allocation information" and a "second-type resource allocation information," respectively, for the sake of convenience of explanation.

These two resource allocation information structures can include all or part of information described below.

Figure 8:
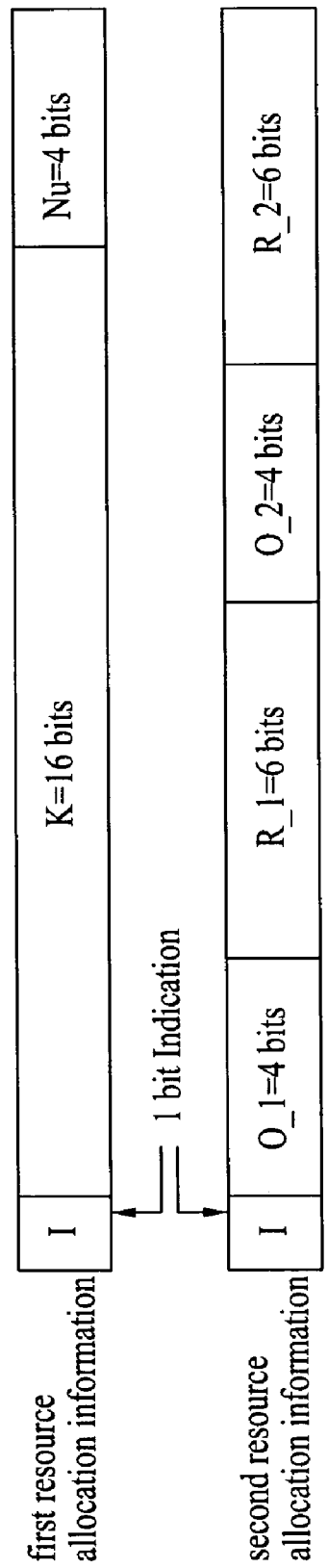
FIG. 8 illustrates resource allocation information structures in an example where 6 basic resource blocks are grouped into a group resource block according to an embodiment of the invention.

FIG. 8 illustrates resource allocation information structures in an example where 6 basic resource blocks are grouped into a group resource block according to an embodiment of the invention.

Specifically, FIG. 8 shows the structures of first-type resource allocation information and second-type resource allocation information in an example where, when 576 subcarriers are used for downlink data transmission in a 10 MHz system band, a combination of a unit time of 0.5 ms and 12 subcarriers is set as the size of a basic resource block, taking into consideration transmission of a small amount of data, and each group resource block is constructed by grouping 6 basic resource blocks in a time interval of 1 ms (i.e., N=6).

As shown in FIG. 8, each of the first-type resource allocation information and the second-type resource allocation information according to an embodiment of the invention may basically include type information I as to whether resources are allocated in units of group resource blocks, each being a group of N basic resource blocks, or in units of basic resource blocks to a specific UE. This type information can be expressed by 1 bit, which indicates whether the information type is the first type or the second type.

The first-type resource allocation information used to allocate communication resources in units of group resource blocks to first-type UEs may further include group resource block allocation information K indicating a group resource block allocated to each first-type UE. Here, it is assumed that the group resource block allocation information is K bits and its specific number of bits is described below.

For example, as shown in FIG. 8, the group resource block allocation information requires 16 bits as the K bits (i.e., K=96/6=16) if it is expressed using a bitmap format when the total number of basic resource blocks is 96 and the number (N) of basic resource blocks of each group resource block is set to 6.

The second-type resource allocation information used to allocate communication resources in units of basic resource blocks to second-type UEs may further include group resource block index information "O" indicating the index of a group resource block including a basic resource block allocated to each second-type UE and basic resource block allocation information "R" indicating the basic resource block allocated to each second-type UE in the group resource block having this index.

Here, the second-type resource allocation information may include two or more group resource block index information "O" and/or two or more basic resource block allocation information "R" as needed. FIG. 8 illustrates an example of the second-type resource allocation information with two group resource block index information "O" and two basic resource block allocation information "R" (i.e., first group resource block index information "O_1", second group resource block index information "O_2", first basic resource block allocation information "R_1", and second basic resource block allocation information "R_2").

More specifically, the first group resource block index information "O_1" indicating the sequence number of a group resource block, to which the basic resource block for the second-type UE is allocated, of the K group resource blocks can be expressed by $\lceil \log_2(K) \rceil$ bits (i.e., O_1=$\lceil \log_2(K) \rceil$). For example, when K is 16, the first group resource block index information "O_1" requires 4 bits (i.e., O_1=$\lceil \log_2(16) \rceil$=4).

For example, the first basic resource block allocation information "R_1" indicating basic resource block allocation information in the allocated group requires 6 bits (i.e., R_1=6 bits) if the basic resource block allocation information in the specific group is expressed using a bitmap format when one group resource block is constructed of 6 basic resource blocks.

As shown in FIG. 8, when there is an additionally allocated group among the K groups, the second group resource block index information "O_2" indicates the sequence number of the group of the K groups and requires $\lceil \log_2(K) \rceil$ bits (i.e., O_2=$\lceil \log_2(K) \rceil$) as with the first group resource block index information "O_1". In the above example where K is 16, the second group resource block index information "O_2" requires 4 bits (i.e., O_1=$\lceil \log_2(16) \rceil$=4).

The second basic resource block allocation information "R_2" indicating basic resource block allocation information in the additionally allocated group requires 6 bits (i.e., R_2=6 bits) if the basic resource block allocation information in the specific group is expressed using a bitmap format when one group resource block is constructed of 6 basic resource blocks as described above.

Only one of the number of group resource block index information "O" or the number of basic resource block allocation information "R" included in the second-type resource allocation information may be two or more as described above although both the number of group resource block index information "O" and the number of basic resource block allocation information "R" included in the second-type resource allocation information are two in the above example.

For example, when the second-type resource allocation information includes two group resource block index information "O" (i.e., O_1 and O_2) and one basic resource block allocation information "R" (i.e., R_1), "O_1" and "R_1" are used to allocate resources in units of basic resource blocks in the specific group resource block as described above and "O_2" is used to allocate resources in units of group resource blocks.

In a Long Term Evolution (LTE) system recently under discussion, resource allocation information transmitted using a downlink control signal can be received by a UE as the UE detects the control signal at a prescribed location in the time-frequency domain. Here, since it is likely that the UE cannot determine the bit length of the control signal until it receives the control signal although it knows the location of the control signal in the time-frequency domain, there is a need to set the same bit length of the control signal for both the first and second types for accurate detection.

Thus, a preferred embodiment of the invention suggests that reserved information "Nu" having a length equal to the difference between the length of the first-type resource allocation information and the length of the second-type resource allocation information be inserted into the shorter of the first-type resource allocation information and the second-type resource allocation information so as to set the length of the first-type resource allocation information and the length of the second-type resource allocation information to be equal as shown in FIG. 8.

Let us consider a specific example where the total number of bits of first-type resource allocation information required by a first-type UE to which resources have been allocated in units of group resource blocks is "L" and the total number of bits of second-type resource allocation information required by a second-type UE to which resources have been allocated in units of basic resource blocks is "M". In this example, if "L" and "M" are different, Nu (=|L−M|) bits can be allocated as reserved bits to the shorter of the two resource allocation information in order to make the lengths of the two resource allocation information similar.

The following table shows a summary of the above example illustrated in FIG. 8.

TABLE 1

| | FIRST-TYPE RESOURCE ALLOCATION INFORMATION | SECOND-TYPE RESOURCE ALLOCATION INFORMATION |
|---|---|---|
| I | 1-bit type information | 1-bit type information |
| K | 96/6 = 16 bits (when bitmap is used) | — |
| O_1 | — | bit |
| R_1 | — | 6 bits (when bitmap is used) |
| O_2 | — | bit |
| R_2 | — | 6 bits (when bitmap is used) |
| L | 1 + 16 = 17 bits | — |
| M | — | 1 + 4 + 6 + 4 + 6 = 21 bits |
| Nu | |17-21| = 4 bits | — |
| Total | 21 bits | 21 bits |

In Table 1, when the bitmap format is used, the first-type resource allocation information can allocate resources of up to 16 group resource blocks to the first-type UE and the second-type resource allocation information can allocate resources of up to 2 group resource blocks (i.e., 12 basic resource blocks) to the second-type UE.

Figure 9:
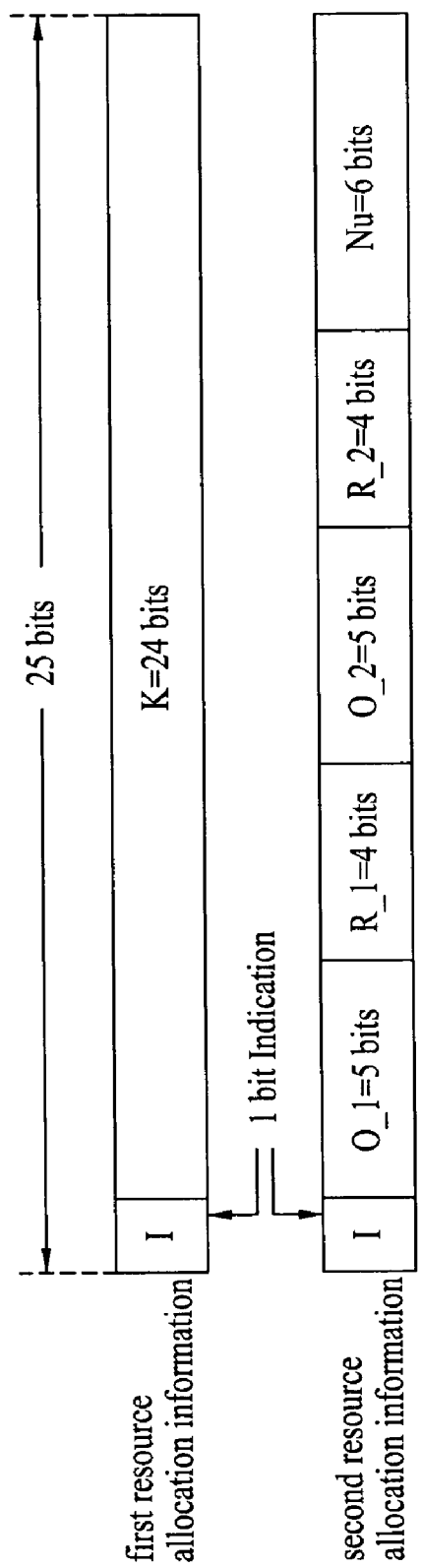
FIG. 9 illustrates resource allocation information structures in an example where 4 basic resource blocks are grouped into a group resource block according to an embodiment of the invention.

FIG. 9 illustrates resource allocation information structures in an example where 4 basic resource blocks are grouped into a group resource block according to an embodiment of the invention.

Specifically, FIG. 9 shows the structures of first-type resource allocation information and second-type resource allocation information in an example where, when 576 subcarriers are used for downlink data transmission in a 10 MHz system band, a combination of a unit time of 0.5 ms and 12 subcarriers is set as the size of a basic resource block, taking into consideration transmission of a small amount of data, in the same manner as in FIG. 8, while each group resource block is constructed by grouping 4 basic resource blocks in a time interval of 1 ms (i.e., N=4).

In this example, each of the first-type resource allocation information and the second-type resource allocation information may include 1-bit type information "I" in the same manner as in the example of FIG. 8. The first-type resource allocation information may also include group resource block allocation information "K" of 24 (=96/4) bits and the second-type resource allocation information may also include first and second group resource block index information "O_1" and "O_2", each of which is 5 bits since $\lceil \log_2(24) \rceil$ is 5, and first and second basic resource block allocation information "R_1" and "R_2", each of which is 4 bits since N is 4.

In addition, reserved information "Nu" of 6 (|25−19|) bits can be inserted into the second-type resource allocation information, which is shorter than the first-type resource allocation information, in order to make the lengths of the first and second resource block allocation information equal.

The following table shows a summary of the above example illustrated in FIG. 9.

TABLE 2

| | FIRST-TYPE RESOURCE ALLOCATION INFORMATION | SECOND-TYPE RESOURCE ALLOCATION INFORMATION |
|---|---|---|
| I | 1-bit type information | 1-bit type information |
| K | 96/4 = 24 bits (when bitmap is used) | — |
| O_1 | — | bit |
| R_1 | — | 4 bits (when bitmap is used) |
| O_2 | — | bit |
| R_2 | — | 4 bits (when bitmap is used) |
| L | 1 + 24 = 25 bits | — |
| M | — | 1 + 5 + 4 + 5 + 4 = 19 bits |
| Nu | — | |25-19| = 6 bits |
| Total | 25 bits | 25 bits |

In Table 2, when the bitmap format is used, the first-type resource allocation information can allocate resources of up to 24 group resource blocks to the first-type UE and the second-type resource allocation information can allocate resources of up to 2 group resource blocks (i.e., 8 basic resource blocks) to the second-type UE.

In a preferred embodiment of the invention, the reserved information "Nu" in the examples shown in Tables 1 and 2 can be used for other purposes.

Let us consider an example where the length of the reserved bits is equal to or greater than that of the group resource block index information "O_1" or "O_2" (for example, 5 (=$\lceil \log_2(24) \rceil$) bits of the group resource block index information "O_1" or "O_2" in the example with K=24 shown in FIG. 9). In the above embodiment of the invention, when it is desired to add the case of allocating all basic resource blocks in the group resource block to the UE as needed, part of the reserved bits can be used as bits for group resource block index information.

That is, in the example of FIG. 9, the reserved bits can be used to apply the above embodiment since the length of the reserved bits is greater than the length of bits indicating one group resource block index information. Thus, since the second-type UE, which is basically allocated resources in units of basic resource blocks, can be allocated an additional group resource block, the second-type UE can be allocated resources of up to 3 group resource blocks, which are the sum of up to 2 group resource blocks when it is basically allocated resources in units of basic resource blocks and the additional group resource block that is allocated to it in units of group resource blocks.

A method for allocating resources and transmitting resource allocation information according to embodiments of the invention will now be described with reference to an example where the method is applied to uplink transmission.

The following description of examples of the method for allocating resources and transmitting resource allocation information in uplink according to the embodiments of the invention is based on the assumption that a Single Carrier Frequency Division Multiple Access (SC-FDMA) technique is used in the currently discussed LTE system. The above description of the method for allocating resources and transmitting resource allocation information in downlink according to the embodiments of the invention can be directly applied to the following description of the method for uplink, except additional assumptions based on the SC-FDMA. Thus, the method for allocating resources and transmitting resource allocation information in uplink according to the invention is not necessarily limited to the following examples based on the SC-FDMA which are described for illustrative purposes.

While the SC-FDMA is technically similar to the OFDMA, the SC-FDMA emphasizes single carrier characteristics in order to reduce disadvantages (for example, a bad peak to average power ratio (PAPR)) of the OFDM modulation scheme with multiple subcarriers. The resource allocation scheme for data transmission in the SC-FDMA is basically based on the assumption that it does not damage the single carrier characteristics. To accomplish this, the resource allocation scheme for data transmission in the SC-FDMA is also based on the assumption that consecutive resource regions are allocated for data transmission.

The easiest method for transmitting resource allocation information, which one can consider under the assumption that consecutive resource regions are allocated, is to transmit an index, with which data starts, and data size information consecutive to the index. Thus, according to an embodiment of the invention, in a communication system in which resources of consecutive time-frequency regions are allocated to each UE, at least one of the group resource block allocation information "K" and the basic resource block allocation information "R" described above with reference to FIGS. 8 and 9 can be set to include start index information of group resource blocks or basic resource blocks allocated to each UE and block count information of the group resource blocks or basic resource blocks allocated to each UE, thereby reducing the number of bits required to indicate the group resource block allocation information and the basic resource block allocation information.

For example, when 1152 subcarriers are used for uplink data transmission in a 20 MHz system band, 96 basic resource blocks will have 12 (=96/8) group resource blocks if a combination of a unit time of 0.5 ms and 12 subcarriers is set as the size of a basic resource block, taking into consideration transmission of a small amount of data, and each group resource block is set to include 8 basic resource blocks (i.e., N=8) in a unit time interval. Allocation of resources for data transmission according to the embodiment of the invention will require 8 (=⌈log$_2$(12×12)⌉) bits since there may be up to 12 indices, which indicate ones of the 12 groups where data starts, and up to 12 data length information may come following the start indices. This has an advantage in that the allocation information requires a smaller number of bits (i.e., 8 bits) than 12 bits required when the allocation information is expressed in a bitmap format.

In this consecutive region allocation method according to the embodiment of the invention which will be referred to as a "basic method", group resource block allocation information and basic resource block allocation information can be expressed by an even smaller number of bits using the following principle.

FIG. 10 illustrates the number of consecutive blocks which can be allocated for each start index in the communication system in which resources of consecutive time-frequency regions are allocated to each UE according to the embodiment of the invention.

For example, the basic method assumes that the number of possible combinations of start index length information and allocated resource block length information is 12*12. However, since the number of actually expressible combinations shaded in FIG. 10 is 12*13/2=78, the basic method has a problem in that it also counts, as possible combinations, regions other than the actually expressible regions shaded in FIG. 10. The shaded regions can be expressed using 7 (=⌈log$_2$(12×13/2)⌉) bits. This method has an advantage in that the information can be expressed by a number of bits which is 1 bit smaller than the number of bits (8 bits) in the basic method according to the embodiment of the invention.

Accordingly, in a preferred embodiment of the invention, at least one, including start index information and block count information, of the group resource block allocation information "K" and the basic resource block allocation information "R" can be set to have a length required to express $l(l+1)/2$ combinations when "l" denotes the total number of indices of group resource blocks or basic resource blocks, thereby further reducing the number of bits representing the information.

The following is a description of the structure for resource allocation information transmission in the uplink communication system, in which resources are allocated to each UE in consecutive time-frequency regions according to the SC-FDMA as described above. In an embodiment of the invention, the first and second-type resource allocation information required to transmit resource allocation information to first and second-type UEs can include all or part of information described below.

Figure 11:
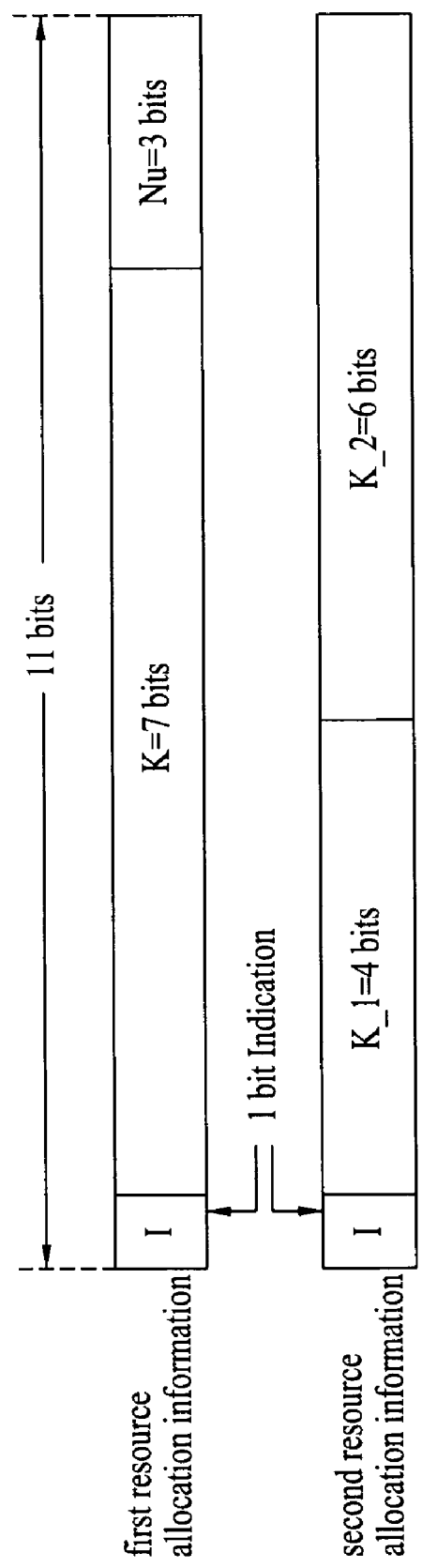
FIG. 11 illustrates an example resource allocation information structure in the communication system in which resources of consecutive time-frequency regions are allocated to each UE according to an embodiment of the invention.

FIG. 11 illustrates an example resource allocation information structure in the communication system in which resources of consecutive time-frequency regions are allocated to each UE according to an embodiment of the invention.

Specifically, FIG. 11 shows an example where, when 1152 subcarriers are used for uplink transmission in a 20 MHz system band, a combination of a unit time of 0.5 ms and 12 subcarriers is set as the size of a basic resource block, taking into consideration transmission of a small amount of data, and each group resource block is set to include 8 basic resource blocks (i.e., N=8) in a unit time interval.

As shown in FIG. 11, each of first-type resource allocation information and second-type resource allocation information may basically include type information I as to whether resource blocks allocated to a specific UE are group resource blocks or basic resource blocks. This type information can be expressed by 1-bit information, which indicates whether the information is of the first type or the second type.

The first-type resource allocation information may also include group resource block allocation information K indicating which group resource block has been allocated to a specific UE. In the embodiment of the invention where it is assumed that consecutive resources are allocated, the resource block allocation information K, which indicates start index information and size information of the allocated group resource block, can be expressed by 7 (=⌈log$_2$(12×13/2)⌉) bits.

The second-type resource allocation information can be expressed by a total number of bits (tk_2=k_1+k_2) of group resource block index information K_1, which indicates the sequence number of the allocated one of the K group resource blocks, and information K_2, which indicates the size of the allocated basic resource block and a start index of the basic resource block-based allocation in the corresponding group.

In the example shown in FIG. 11, the group resource block index information K_1 can be expressed by 4 (=⌈log$_2$(12)⌉) bits required to represent a total of 12 group indices. The information K_2, which indicates the size of the allocated basic resource block and a start index of the basic resource block-based allocation in the corresponding group, can be expressed by 6 (=⌈log$_2$(8×9/2)⌉) bits since the number of basic resource blocks included in one group resource block is 8 (i.e., N=8).

When "L" denotes the length of the first-type resource allocation information required for first-type UEs which are allocated resources in units of group resource blocks and "M" denotes the length of the second-type resource allocation information required for second-type UEs, reserved information "Nu" of |L−M| bits can be inserted into the shorter of the first-type resource allocation information and the second-type resource allocation information to make the lengths of the first-type resource allocation information and the second-type resource allocation information equal. This allows each UE to reliably receive resource allocation information even when it does not know the length of the resource allocation information.

The following table shows a summary of the example described above with reference to FIG. 11.

TABLE 3

| | FIRST-TYPE RESOURCE ALLOCATION INFORMATION | SECOND-TYPE RESOURCE ALLOCATION INFORMATION |
|---|---|---|
| I | 1-bit type information | 1-bit type information |
| K | | — |
| K_1 | | =4 bits |
| K_2 | | =6 bits |
| tk_2 | | 4 + 6 = 10 bits |
| Nu | 3 bits | — |
| Total | 11 bits | 11 bits |

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The above resource allocation method and resource allocation information transmission method according to the present invention can be applied to both the downlink and uplink of the 3GPP LTE system. According to the same principles, the above methods can be applied not only to the 3GPP LTE system described above but also to any other communication system which can selectively apply the grouping of resource regions allocated to a specific UE.

The invention claimed is:

1. A method for allocating resources to a plurality of user equipments (UEs) in a communication system, the method comprising:
   defining at least one of the plurality of UEs as a first-type UE;
   defining at least one other of the plurality of UEs as a second-type UE;
   allocating resources to the first-type UE in units of group resource blocks;
   allocating resources to the second-type UE in specific units other than the group resource blocks;
   transmitting first-type resource allocation information to the first-type UE; and
   transmitting second-type resource allocation information to the second-type UE,
   wherein the group resource blocks are preset as units, each being a group of a specific number of basic resource blocks, the basic resource blocks preset as smallest units of resource allocation,
   wherein reserved information (Nu) having a length equal to a difference between a length of the first-type resource allocation information and a length of the second-type resource allocation information is inserted into a shorter one of the first-type resource allocation information and the second-type resource allocation information.

2. The method according to claim 1, wherein allocating resources to the second-type UE comprises allocating units of the basic resource blocks.

3. The method according to claim 1, wherein the first-type resource allocation information transmitted to the first-type UE comprises at least different type indicators than the second-type resource allocation information transmitted to the second-type UE.

4. A method for transmitting resource allocation information to a plurality of user equipments (UEs) in a communication system, the method comprising:
   defining at least one of the plurality of UEs as a first-type UE;
   defining at least one other of the plurality of UEs as a second-type UE;
   transmitting first-type resource allocation information to the first-type UE, the first-type UE resource allocation information used to allocate resources in units of group resource blocks; and
   transmitting second-type resource allocation information to the second-type UE, the second-type UE resource allocation information used to allocate resources in specific units other than the group resource blocks,
   wherein the group resource blocks are preset as units, each being a group of a specific number of basic resource blocks, the basic resource blocks preset as smallest units of resource allocation,
   wherein each of the first-type resource allocation information and the second-type resource allocation information includes type information (I) indicating a resource allocation information type, and
   wherein reserved information (Nu) having a length equal to a difference between a length of the first-type resource allocation information and a length of the second-type resource allocation information is inserted into a shorter one of the first-type resource allocation information and the second-type resource allocation information.

5. The method according to claim 4, further comprising using the second-type resource allocation information to allocate resources in units of the basic resource blocks to the second-type UE.

6. The method according to claim 5, wherein the first-type resource allocation information further includes group resource block allocation information (K) indicating a group resource block allocated to each first-type UE.

7. The method according to claim 5, wherein the second-type resource allocation information includes:
   group resource block index information (O) indicating an index of a group resource block including a basic resource block allocated to each second-type UE; and
   basic resource block allocation information (R) indicating a basic resource block allocated to each second-type UE in the group resource block having the index.

8. The method according to claim 7, wherein the group resource block index information (O) includes at least two group resource block index information (O) and the basic resource block allocation information (R) includes at least two basic resource block allocation information (R).

9. The method according to claim 4, wherein:
   the communication system allocates resources of consecutive time-frequency regions to each of the plurality of UE;
   the first-type resource allocation information further includes group resource block allocation information (K) indicating a group resource block allocated to each first-type UE;
   the second-type resource allocation information includes group resource block index information (O) indicating an index of a group resource block including a basic resource block allocated to each second-type UE and basic resource block allocation information (R) indicating a basic resource block allocated to each second-type UE in the group resource block having the index; and
   at least one of the group resource block allocation information (K) and the basic resource block allocation information (R) includes start index information of group resource blocks or basic resource blocks allocated to each of the plurality of UE and block count information of the group resource blocks or basic resource blocks allocated to each of the plurality of UE.

10. The method according to claim 9, wherein at least one, including the start index information and the block count information, of the group resource block allocation information (K) and the basic resource block allocation information (R) has a length required to express $i(i+1)/2$ combinations when "i" is the total number of indices of the group resource blocks or the basic resource blocks.

* * * * *